Jan. 14, 1958 H. WÜSTER 2,819,578
ROTARY RAKE AND TEDDER
Filed March 11, 1955 2 Sheets-Sheet 1
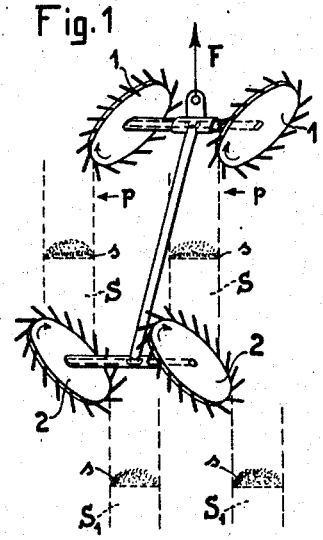
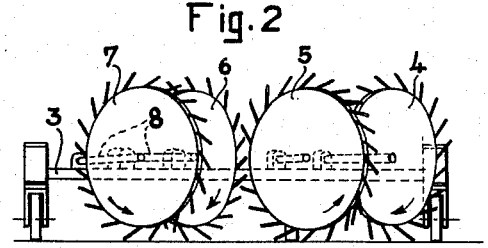
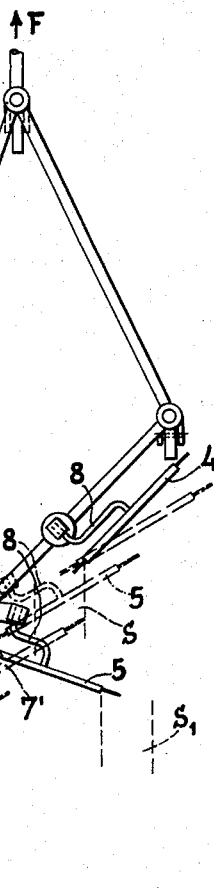
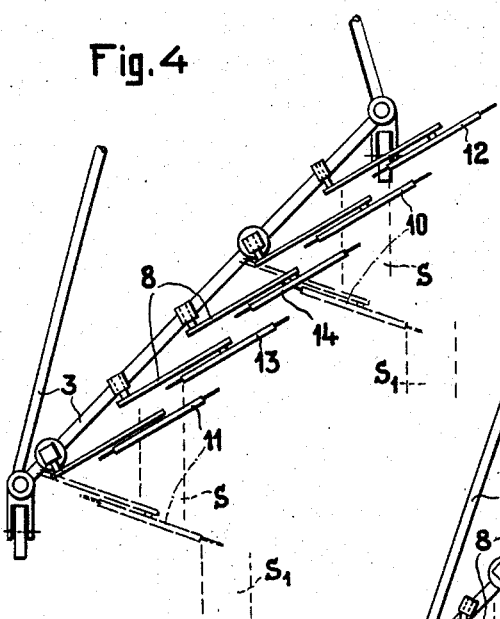
INVENTOR.
HEINRICH WÜSTER

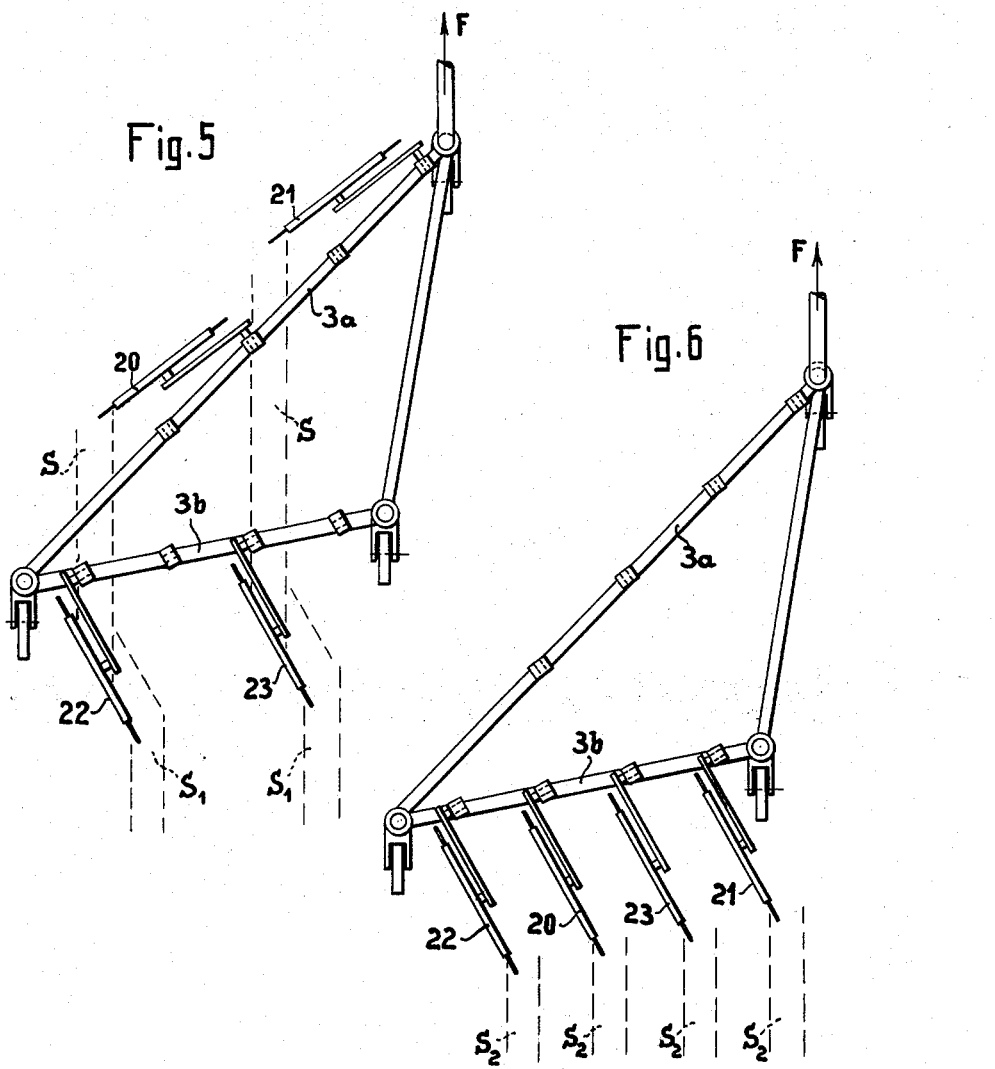

United States Patent Office 2,819,578
Patented Jan. 14, 1958

2,819,578

ROTARY RAKE AND TEDDER

Heinrich Wuster, Imst, Austria

Application March 11, 1955, Serial No. 493,765

3 Claims. (Cl. 56—366)

This invention relates to a tedder or implement for turning grass crops, particularly hay, lying on the ground, by means of freely rotatably mounted spiked wheels which are inclined relative to the working direction (direction of travel) and to which rotation is imparted by their rolling engagement with the ground. Known implements of that type have the disadvantage that the spiked wheels effect substantially only a lateral gathering of the material lying on the ground and that part of the material, in most cases the lowermost layer of the swaths formed, is left undisturbed and thus is not loosened and/or turned in the manner necessary for effective drying.

The invention avoids said disadvantages by arranging the spiked wheels in groups which consist of one or several wheels each and are staggered behind each other in the direction of travel so that the swath zones of the foregoing spiked wheels or spiked wheel groups lie entirely or partly in the range of action of the following spiked wheels or spiked wheel groups, which are suitably inclined in a sense opposite to that of the foregoing spiked wheels, so that the respective following spiked wheels or spiked wheel groups act as tedding wheels for turning the swaths formed by the foregoing wheels.

That construction ensures that all material is handled and is loosened up and/or turned, which involves pitching of the stems. This operation is performed by the respective following tedding wheel, which lifts also the lowermost layer of the previously formed swath from the ground and in scattering and lifting the swath moves that previously lowermost layer to the top of the turned swath. Thus while the swaths are loosened the stems are pitched against each other once from the right and once from the left and a higher, well ventilated swath is obtained for drying.

For tedding hay it has been suggested to arrange the spiked wheels of tedders of the present type in laterally spaced groups. However, the arrangement is such that the material handled by one group lies outside the range of action of the other group. Thus no cooperation of the spiked wheels or spiked wheel groups in the manner provided by the invention is obtained and the known implement is incapable, therefore, of tedding in the manner according to the invention.

According to the invention a tedder movable in a desired direction of travel and comprising spiked wheels inclined relative to said direction of travel and adapted to be rotated by a rolling engagement with the ground is characterized in that said spiked wheels comprise at least one raking wheel adapted to convey grasslike material encountered by it into a swath zone adjacent to its path, and at least one tedding wheel each of which is associated with and arranged behind one of said raking wheels and laterally staggered therefrom to encounter and turn over grasslike material disposed in said swath zone.

The invention further provides particularly favorable constructions of the implement with the object of increasing its capacity, adaptability, and field of application.

Other details will be apparent from the following description, in which the invention will be illustrated more fully with reference to the accompanying drawings, in which Fig. 1 is a diagrammatic view showing the mode of operation of the implement according to the invention, Figs. 2 and 3 are diagrammatical front and top plan views, respectively, showing an illustrative embodiment of the implement, Fig. 4 shows another illustrative embodiment having a larger number of spiked wheels, Fig. 5 shows a third embodiment of the invention, in which the raking and tedding wheels are arranged on two different members of the draft frame, and Fig. 6 shows the last-mentioned embodiment after conversion into a rake for gathering a plurality of individual swaths.

Fig. 1 shows in the upper part two spiked wheels 1, which are inclined relative to the direction of travel F and are freely rotatably mounted on a draft frame. During travel these wheels 1 are rotated by their rolling engagement with the ground and in doing so laterally gather the material, such as hay, lying on the ground, in the direction of arrows $p$ to form swaths S. Whereas that operation does involve a turning over of the material raked, that turning over does not affect all the material. As is apparent from the cross-sectional showings of the swaths, the lowermost layer $s$ of the swath, i. e. the layer which fell on that part of the ground when the grass was cut, is not disturbed by the spiked raking wheels. Thus the raking wheels 1 do not achieve a perfect tedding of the material raked since it is not loosened sufficiently for effective, quick drying.

To achieve this object two additional spiked wheels 2 are arranged, according to the lower part of Fig. 1, behind the two aforementioned raking wheels 1. These spiked wheels 2 are laterally staggered from the raking wheels and inclined in the opposite sense in such a manner that in moving in the direction of travel F the spiked wheels 2 turn over the swaths S and leave them back as turned swaths $S_1$. Thus the spiked wheels 2, termed tedding wheels, cause the aforementioned lowermost layer $s$ to appear on the top of the swath $S_1$, as is apparent from the cross-sectional showings thereof. In this manner the layer $s$ is also loosened as is required for drying.

It is obvious that the same operation can also be performed with only one raking wheel 1 and one tedding wheel 2, as well as with more than two raking wheels and a corresponding number of tedding wheels 2, provided that the tedding wheels are correspondingly staggered relative to the raking wheels.

In the illustrative embodiment shown in Figs. 2 and 3, a common draft frame 3 carries cranks 8 freely rotatably mounting four spiked wheels 4, 5, 6 and 7. The cranks 8 are linked to the frame 3 in such a manner that the spiked wheels when rolling on the ground have a sufficient freedom of movement in a vertical plane. The spiked wheels 4 and 6 function like the raking wheels 1, the spiked wheels 5 and 7 like the tedding wheels 2 of Fig. 1. It is suitable to arrange the spiked wheels 4–7, more particularly their axle cranks 8, on the frame 3 so that they are pivotally adjustable or can be attached to different points of the frame, to enable a suitable relative positioning of the spiked wheels, particularly of the tedding wheels relative to the raking wheels, becomes possible.

As is indicated with broken lines in Fig. 3, the pivotal or changeable mounting of the spiked wheels 4–7 is suitably provided so that the spiked wheels can be set in substantial alignment, with a lateral overlap, so that they are adapted to form a single lateral swath upon movement of the implement in the direction of travel F. To this end it is sufficient; e. g., to pivotally adjust the spiked wheels 4 and 6 by a small amount, to swing the spiked wheel 5 by means of the bracket arm on the axis O, and to shift and pivotally adjust the spiked wheel 7 from the position shown in solid lines to position 7' on the frame 3.

In implementing the invention, the two raking wheels 4, 6 and the two tedding wheels 5, 7 can be replaced by one raking wheel and one tedding wheel or by more than two raking wheels and a corresponding number of tedding wheels.

As is diagrammatically shown in Fig. 4, an implement having five spiked wheels permits of a particularly simple conversion from a tedder into a rake for forming a single lateral swath. This can be accomplished simply by a pivotal adjustment of the second and fifth spiked wheels 10 and 11, whereas the first and fourth spiked wheels 12 and 13 can be left in their position relative to the frame 3.

For the operation of the implement as a tedder it is sufficient to remove the middle spiked wheel or to render it inoperative by lifting it sufficiently.

According to Fig. 5 the arrangement may be such that raking wheels 20, 21 are attached to a front member 3a of the draft frame, whereas tedding wheels 22, 23 are attached to a rear member 3b of the draft frame, so that the swaths S formed by the raking wheels 20, 21 are again turned by the tedding wheels 22, 23 to form the swaths $S_1$.

In this case the mounting means for the spiked wheels may be constructed, e. g., according to Fig. 6 in such a manner that the raking wheels 20, 21 can be shifted from the front frame member 3a to the rear frame member 3b, to form a rake with which four individual swaths $S_2$ can be gathered.

It is obvious that with that illustrative embodiment the number of raking and tedding wheels, respectively, may also be larger or smaller than two.

What I claim is:

1. An implement comprising a beam, a plurality of crop engaging toothed wheels, a series of means on said beam individually mounting the wheels freely for rotation by crop or ground engagement and shiftably generally vertically for accommodation to planular irregularities in ground surface, said series of means being adapted for individual positioning on said beam to dispose said wheels in echelon with their planes oblique to the normal line of travel of the implement to move cut crops in a first lateral direction into a windrow, said series of means being further adapted for individually selective alternative positioning on said beam to dispose one or more of said wheels with its plane transverse to the general plane of the echelon and staggered with respect to the windrow forming wheel or wheels so that its range of action lies at least in part on the windrow to move windrowed cut crops in a second lateral direction generally opposite to that of the first lateral direction.

2. An implement as defined in claim 1 in which said series of means comprises a plurality of crank arms, each of said arms being provided with an axle element at one end mounting a wheel, means at the opposite end of the arm pivotally mounting the arm for up and down movement, and at least one of said last named means being adapted for adjustability on said beam in a horizontal arc, and the arm being of sufficient length relative to the radius of the wheel to maintain the periphery of the wheel clear of the beam when the wheel is positioned with its vertical plane approaching a right angular relationship to the beam.

3. An implement comprising a plurality of toothed wheels, means mounting said wheels linearly separated and free for rotation by crop or ground engagement, an advanced one of said wheels being positioned obliquely to the normal line of travel of the implement to impart by its rotation movement of cut crops laterally of the line of travel into a swath zone, a trailing one of said wheels being positioned obliquely opposite to the positioning of the advanced wheel to impart by its rotation movement of cut crops laterally of the line of travel in a direction generally opposite the movement imparted by the advanced wheel, said trailing wheel being staggered from the advanced wheel with reference to the line of draft so that the range of action of the trailing wheel lies generally in said swath zone.

References Cited in the file of this patent

UNITED STATES PATENTS

| 867,025 | Ellis | Sept. 24, 1907 |
| 2,447,354 | Morrill | Aug. 17, 1948 |
| 2,459,961 | Pollard | Jan. 25, 1949 |
| 2,472,260 | Morrill | June 7, 1949 |
| 2,652,679 | Krause | Sept. 22, 1953 |

FOREIGN PATENTS

| 518,628 | Belgium | Apr. 15, 1953 |